United States Patent
Boley et al.

(10) Patent No.: US 11,743,643 B2
(45) Date of Patent: Aug. 29, 2023

(54) DEVICES AND METHOD FOR HEARING DEVICE PARAMETER CONFIGURATION

(71) Applicant: GN HEARING A/S, Ballerup (DK)

(72) Inventors: Jonathan Boley, Mundelein, IL (US); Almer Jacob Van Den Berg, Ballerup (DK); Adam H. Svec, Minneapolis, MN (US)

(73) Assignee: GN HEARING A/S, Ballerup (DK)

( * ) Notice: Subject to any disclaimer, the term of this patent is extended or adjusted under 35 U.S.C. 154(b) by 12 days.

(21) Appl. No.: 16/684,544

(22) Filed: Nov. 14, 2019

(65) Prior Publication Data

US 2021/0152933 A1    May 20, 2021

(51) Int. Cl.
| | | |
|---|---|---|
| H04R 3/04 | (2006.01) | |
| G06F 3/04842 | (2022.01) | |
| G06F 3/04847 | (2022.01) | |
| H04R 29/00 | (2006.01) | |

(52) U.S. Cl.
CPC ........... *H04R 3/04* (2013.01); *G06F 3/04842* (2013.01); *G06F 3/04847* (2013.01); *H04R 29/00* (2013.01)

(58) Field of Classification Search
CPC combination set(s) only.
See application file for complete search history.

(56) References Cited

U.S. PATENT DOCUMENTS

| 7,024,000 B1 * | 4/2006 | Gabara | A61B 5/121 |
| | | | 381/60 |
| 10,321,242 B2 | 6/2019 | De Vries et al. | |
| 2009/0103742 A1 * | 4/2009 | Ribic | H04R 25/35 |
| | | | 381/60 |
| 2010/0020988 A1 * | 1/2010 | McLeod | H03G 5/025 |
| | | | 381/107 |
| 2010/0080398 A1 * | 4/2010 | Waldmann | H04R 25/70 |
| | | | 381/314 |
| 2013/0243227 A1 * | 9/2013 | Kinsbergen | H04M 1/72478 |
| | | | 381/314 |
| 2014/0275730 A1 * | 9/2014 | Lievens | H04R 25/606 |
| | | | 600/25 |

(Continued)

FOREIGN PATENT DOCUMENTS

| WO | WO 2010/015027 | 2/2010 | |
| WO | WO 2012/066149 | 5/2012 | |
| WO | WO-2018209406 A1 * | 11/2018 | ............... A61B 5/12 |

OTHER PUBLICATIONS

PCT International Preliminary Report on Patentability for International Appln. No. PCT/EP2020/082049 dated May 17, 2022.

Primary Examiner — Duc Nguyen
Assistant Examiner — Assad Mohammed
(74) Attorney, Agent, or Firm — Vista IP Law Group, LLP

(57) ABSTRACT

An electronic device for configuring a hearing device parameter of a hearing device to be worn by a user, includes: a processor; a memory; and a user interface, wherein the processor is configured to: electronically obtain an initial audiogram; obtain, via the user interface, a first configuration parameter indicative of hearing loss and/or user preference in a first frequency range; determine a configuration audiogram based on the first configuration parameter and the initial audiogram; determine a gain parameter based on the configuration audiogram; and configure the hearing device parameter of the hearing device based on the gain parameter.

26 Claims, 3 Drawing Sheets

(56) References Cited

U.S. PATENT DOCUMENTS

| | | | | |
|---|---|---|---|---|
| 2015/0049876 | A1* | 2/2015 | Kim | H04R 25/70 |
| | | | | 381/60 |
| 2015/0281853 | A1* | 10/2015 | Eisner | H04R 25/505 |
| | | | | 381/312 |
| 2015/0341731 | A1* | 11/2015 | Polak | A61N 1/0541 |
| | | | | 600/25 |
| 2018/0007477 | A1* | 1/2018 | De Vries | H04R 25/00 |
| 2018/0063618 | A1* | 3/2018 | Boesen | H04R 1/1041 |
| 2018/0242090 | A1* | 8/2018 | Sigwanz | H04R 25/70 |
| 2019/0108324 | A1* | 4/2019 | Graube | H04L 9/3231 |
| 2019/0356989 | A1* | 11/2019 | Li | H04R 25/50 |
| 2020/0015022 | A1* | 1/2020 | Chang | H04R 25/60 |

\* cited by examiner

DEVICES AND METHOD FOR HEARING DEVICE PARAMETER CONFIGURATION

FIELD

The present disclosure relates to a hearing device and an electronic device, and to a related method for configuring hearing device parameters of a hearing device to be worn by a user.

BACKGROUND

When hearing device users are provided with a hearing device, the gain parameters and other hearing device parameters of the hearing device may be pre-set. For example, when hearing aid users are provided with a hearing aid, the gain parameters of the hearing aid are usually pre-set based on a clinically determined audiogram. Thereby, the user is ensured a hearing aid, which is optimally configured for compensating the hearing loss of the user. Hearing aid users may have the possibility of adjusting loudness and spectral balance.

SUMMARY

There is a need for hearing devices and electronic devices, and methods for configuring hearing device parameters of a hearing device to be worn by a user, which provides an easier and more intuitive way of setting and/or adjusting the hearing device parameters, e.g. gains, of the hearing device, optionally without requiring a time-consuming clinically determined audiogram.

A method, optionally performed in an electronic device, for configuring hearing device parameters of a hearing device to be worn by a user is disclosed. The method comprises obtaining an initial audiogram; obtaining, via a user interface, a first configuration parameter indicative of hearing loss and/or user preference in a first frequency range; optionally obtaining, via the user interface, a second configuration parameter indicative of hearing loss and/or user preference in a second frequency range different from the first frequency range; determining a configuration audiogram based on the first configuration parameter, optionally the second configuration parameter, and optionally the initial audiogram; determining gain parameters based on the configuration audiogram; and configuring the hearing device parameters of the hearing device based on the gain parameters.

Further, an electronic device for configuring hearing device parameters of a hearing device to be worn by a user is disclosed. The electronic device comprises a processor, a memory, and an interface comprising a user interface. The processor is configured to obtain an initial audiogram; obtain, via the user interface, a first configuration parameter indicative of hearing loss and/or user preference in a first frequency range; optionally obtain, via the user interface, a second configuration parameter indicative of hearing loss and/or user preference in a second frequency range different from the first frequency range; determine a configuration audiogram based on the first configuration parameter, optionally the second configuration parameter, and optionally the initial audiogram; determine gain parameters based on the configuration audiogram; and configure the hearing device parameters of the hearing device based on the gain parameters.

It is an important advantage of the electronic device that the electronic device provides an easy-to-use intuitive user interface for adjusting a complex multiband compressor. Further, determining gain parameters based on a configuration audiogram, which is based on the first configuration parameter, the second configuration parameter, and an initial audiogram requires a minimum of computational power and an increased speed of computation.

It is an advantage that a hearing aid user in a simple way can adjust a set of complex hearing aid configuration parameters.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
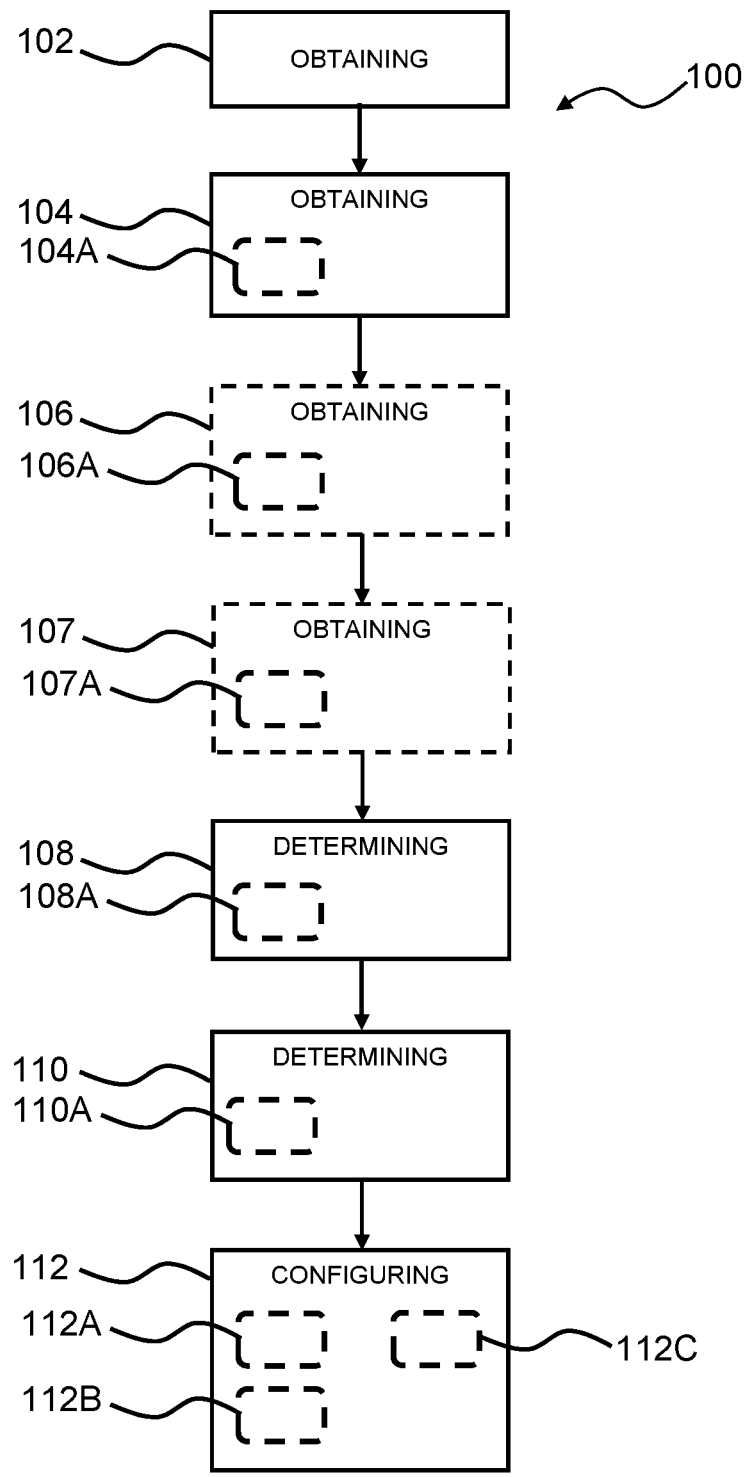
FIG. 1 is a flow diagram of an exemplary method according to the disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be a hearable or a hearing aid, wherein the processor is configured to compensate for a hearing loss of a user.

The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid. The hearing device may comprise a first earpiece and a second earpiece, wherein the first earpiece and/or the second earpiece is an earpiece as disclosed herein.

The hearing device may be configured for wireless communication with one or more devices, such as with another hearing device, e.g. as part of a binaural hearing system, and/or with one or more accessory devices/electronic devices, such as a smartphone and/or a smart watch. The hearing device optionally comprises an antenna for converting one or more wireless input signals, e.g. a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices, such as a smartphone.

The hearing device optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device comprises a processor for processing input signals, such as (optionally pre-processed) transceiver input signal(s) and/or (optionally pre-processed) microphone input signal(s). The processor is optionally configured to compensate for hearing loss of a user of the hearing device. The processor provides an electrical output signal based on the input signals to the processor. Input terminal(s) of the processor are optionally connected to respective microphones and/or output terminals of a pre-processing unit. For example, a transceiver input terminal of the processor may be connected to the transceiver and/or a transceiver output terminal of the pre-processing unit. One or more microphone input terminals of the processor may be connected to respective one or more microphones and/or microphone output terminals of the pre-processing unit.

A method, e.g. performed by an electronic device, for configuring hearing device parameters of a hearing device to be worn by a user is disclosed.

The method optionally comprises obtaining, such as receiving, determining, or retrieving, an initial audiogram, e.g. from a server device or from memory of the electronic device. Obtaining an initial audiogram may refer to obtaining and/or assuming and/or suggesting an initial audiogram. Thereby, obtaining an initial audiogram may e.g. refer to selecting or choosing an initial audiogram from a set of default audiograms, e.g. based on a set of rules. Obtaining an initial audiogram may refer to determining and/or calculating an initial audiogram based on conditions of the user, for example depending on age (elderly or pediatric users) and/or gender. An initial audiogram may refer to one of a plurality of pre-determined (default) audiograms. For example, a pre-determined audiogram may be based on default audiograms representing different typical groups of users of hearing devices, for example, people with a normal hearing or people with some specific amount of hearing loss, for example depending on age (elderly or pediatric users) and/or gender. An initial audiogram may refer to a clinically determined audiogram. An initial audiogram may be obtained automatically. Alternatively, an initial audiogram may be obtained manually.

An initial audiogram may be defined or represented by a set of parameters, e.g. a set of parameters $IA\_1$-$IA\_N$, where N indicates the index into an array of frequency ranges. N is an integer, such as in the range from 1 to 50. In one or more exemplary methods/devices, the number N of parameters is in the range from 5 to 25, such as 10, 15, or 20.

The method comprises obtaining, via a user interface, a first configuration parameter indicative of hearing loss and/or user preference in a first frequency range. For example, the user interface may comprise a first user interface element also denoted first control, such as a first slider, e.g. as part of a graphic equalizer (EQ). The first control may allow a user to indicate a desired first gain or a desired hearing compensation in a first frequency range. Thus, obtaining, via a user interface, a first configuration parameter indicative of hearing loss and/or user preference in a first frequency range may comprise determining a position, such as a vertical position, of the first slider and determine the first configuration parameter based on the (vertical) position of the first slider. Accordingly, the user interface may comprise a graphic equalizer. The graphic equalizer may comprise a curve representative of the hearing loss of the user and/or user preference. The curve representative of the hearing loss of the user and/or user preference may be updated continuingly when a user moves the first user interface element. The curve representative of the hearing loss and/or user preference crosses or is connected to the first user interface element. The first configuration parameter may represent the user's desired change in gain in the first frequency range.

In one or more exemplary methods and/or devices, a single configuration parameter, such as the first configuration parameter, may be sufficient to determine the configuration audiogram, e.g. for a user having a mild hearing loss.

The method optionally comprises obtaining, via the user interface, a second configuration parameter indicative of hearing loss and/or user preference in a second frequency range. The second frequency range may be different from the first frequency range or overlapping only in parts with the first frequency range.

The first frequency range may have a maximum frequency less than a first frequency threshold, such as less than 500 Hz, less than 1 kHz, or less than 1.5 kHz. The first frequency range may comprise a first frequency band from 250 Hz to 500 Hz.

The second frequency range may have a minimum frequency larger than a second frequency threshold, such as larger than 1 kHz, larger than 1.5 kHz, or larger than 2 kHz. The second frequency range may comprise a second frequency band from 1 kHz to 4 kHz, such as from 2 kHz to 4 kHz.

For example, the user interface may comprise a second user interface element also denoted second control, such as a second slider, e.g. as part of a graphic equalizer (EQ). The second control may allow a user to indicate a desired second gain or a desired hearing compensation in a second frequency range. Thus, obtaining, via a user interface, a second configuration parameter indicative of hearing loss and/or user preference in a second frequency range may comprise determining a position, such as a vertical position, of the second slider and determine the second configuration parameter based on the (vertical) position of the second slider. The curve representative of the hearing loss and/or user preference of the user may be updated continuingly when a user moves the second user interface element. The curve representative of the hearing loss and/or user preference crosses or is connected to the second user interface element. The second configuration parameter may represent the user's desired change in gain in the second frequency range.

A user interface may refer to a feature via which interaction between the user and the hearing device occur. For example, the user interface may receive input in the form of a tactile, a visual, and/or an auditory input from the user. The user interface may comprise a touch panel (touch-sensitive display), a keyboard, and/or a microphone.

For example, a hearing device may be configured for communication (e.g. wireless communication) with one or more accessory devices, such as a smartphone, tablet and/or a smart watch, wherein an accessory device comprises the user interface, and the first configuration parameter and/or the second configuration parameter may be obtained via the user interface of the one or more accessory devices.

A configuration parameter may refer to a parameter related to a specific frequency range or a specific frequency band. For example, a configuration parameter may refer to a frequency band fix point.

The method comprises determining a configuration audiogram, e.g. based on one or more of the first configuration parameter, the second configuration parameter, and the initial audiogram. A configuration audiogram may be defined or represented by a set of parameters, e.g. a set of parameters $A\_1, A\_2, \ldots, A\_N$, where N indicates the index into an array of frequency ranges. N is an integer, such as in the range from 1 to 50. In one or more exemplary methods/devices, the number N of parameters is in the range from 5 to 25, such as 10, 15, or 20. Parameters of the configuration audiogram may be indicative of a user's hearing loss and/or user preference in different frequency ranges.

The method comprises determining gain parameters, also denoted $G\_1, G\_2, \ldots, G\_N$, based on the configuration audiogram, e.g. based on one or more parameters $A\_1, \ldots, A\_N$ of the configuration audiogram. Determining may refer to and/or include calculating. For example, determining a configuration audiogram based on the first configuration parameter, the second configuration parameter, and the initial audiogram may comprise calculating a configuration audiogram based on the first configuration parameter, the second configuration parameter, and the initial audiogram. For example, determining gain parameters based on the configuration audiogram may comprise calculating gain parameters based on the configuration audiogram. In one or more exemplary methods, determining gain parameters comprises determining primary and secondary gain parameters for one or more, such as a plurality or each of, parameters in the configuration audiogram. A primary gain parameter may be a level-dependent gain at a primary level, e.g. 40 or 50 dB SPL, and/or a secondary gain parameter may be a level-dependent gain at a secondary level, e.g. 65 or 80 dB SPL. Thus, two gain parameters may be determined for each frequency band $F\_1$-$F\_N$. In other words, determining gain parameters comprises determining a first primary gain parameter $G\_1\_50$ and/or a first secondary gain parameter $G\_1\_80$, optionally where $G\_1\_50$ is level-dependent gain at 50 dB SPL and $G\_1\_80$ is level-dependent gain at 80 dB SPL in a first frequency range $F\_1$. In one or more exemplary methods, determining gain parameters comprises determining tertiary gain parameters for one or more, such as a plurality or each of, parameters in the configuration audiogram. A tertiary gain parameter may be a level-dependent gain at a tertiary level, e.g. 95 dB SPL. Thus, three gain parameters may be determined for each frequency band $F\_1$-$F\_N$.

Determining gain parameters optionally comprises determining primary gain parameters $G\_i\_P$ and/or secondary gain parameters $G\_i\_S$ for frequency ranges $F\_i$, where $i=1, \ldots, N$. Determining gain parameters optionally comprises determining tertiary gain parameters $G\_i\_T$ for frequency ranges $F\_i$, where $i=1, \ldots, N$.

The method comprises configuring the hearing device parameters of the hearing device based on the gain parameters. Configuring the hearing device parameters of the hearing device parameters may comprise wirelessly transmitting the hearing device parameters to the hearing device.

For example, when a user puts on a hearing device for the first time, the initial audiogram may be assumed to define an audiogram of a hearing device comprising thresholds of 20 dB hearing level (HL) from 250 Hz-8,000 Hz in both ears. When the user listens to the environment, the user may decide to increase gain in the low frequencies and in accordance therewith, e.g. move a first control embodied as a first slider of the user interface upwards. The position, such as vertical position, of the first slider, e.g. at lift-off, may be used as input for determining a first configuration parameter indicative of hearing loss and/or user preference in a first (low-frequency) range. In other words, a first configuration parameter is obtained via the user interface (first user interface element/first control), e.g. when a user lifts his/her finger from the user interface. Likewise, the user may decide to decrease gain in the low frequencies and in accordance therewith, e.g. move the first control embodied as a first slider of the user interface downwards.

Further, when the user listens to the environment, the user may decide to increase gain in the high frequencies and in accordance therewith, e.g. move a second control embodied as a second slider of the user interface upwards. The position, such as vertical position, of the second slider, e.g. at lift-off, may be used as input for determining a second configuration parameter indicative of hearing loss and/or user preference in a second (high-frequency) range. In other words, a second configuration parameter is obtained via the user interface (second user interface element/second control), e.g. when a user lifts his/her finger from the user interface. Likewise, the user may decide to decrease gain in the high frequencies and in accordance therewith, e.g. move the second control embodied as a second slider of the user interface downwards.

Thereby, a solution in which a first configuration parameter indicative of hearing loss and/or user preference in a first frequency range and a second configuration parameter indicative of hearing loss and/or user preference in a second frequency range is provided. For example, in case the first configuration parameter is related to low frequencies, e.g. frequencies less than 1 kHz or even less than 500 kHz and the second configuration parameter is related to high frequencies, the configuration of the hearing device parameters is well-understood by users generally and the users can express their intent with high precision.

Accordingly, a simplified, easy-to-use, and intuitive method/device for a user to adjust a complex multiband compressor of a hearing device is provided.

Also, a method for configuring hearing device parameters of a hearing device to be worn by a user is disclosed, wherein the method comprises obtaining an initial audiogram; obtaining, via a user interface, a first configuration parameter indicative of hearing loss and/or user preference in a first frequency range; determining a configuration audiogram based on the first configuration parameter and the initial audiogram; determining gain parameters based on the configuration audiogram, and configuring the hearing device parameters of the hearing device based on the gain parameters.

For example, when obtaining a first configuration parameter indicative of hearing loss and/or user preference in a first frequency range and determining a configuration audiogram based on the first configuration parameter and the initial audiogram, the first configuration parameter may represent all frequencies determined to be relevant e.g. for speech and audio (e.g., intelligibility, quality, and/or comfort), such as one or more frequencies, such as a high frequency and a low frequency. All frequencies determined to be relevant may be within the frequency range 20 Hz-20 kHz, 1 kHz-8 kHz, or 1 kHz-4 kHz. Thereby, a simplified method for configuring hearing device parameters of a hearing device to be worn by a user is provided.

In one or more exemplary methods, determining a configuration audiogram comprises interpolating the configuration audiogram based on the first configuration parameter, the second configuration parameter, and the initial audiogram. Interpolating the configuration audiogram may comprise curve-fitting based on the first configuration parameter and/or the second configuration parameter.

For example, determining a configuration audiogram may comprise determining a first parameter $A\_1$ (for a first frequency range $F\_1$) of the configuration audiogram based on the first configuration parameter $P\_1$ and a first parameter $IA\_1$ of the initial audiogram, e.g. $A\_1=IA\_1+P\_1$.

For example, determining a configuration audiogram may comprise determining a second parameter $A\_2$ (for a second frequency range $F\_2$) of the configuration audiogram based on the second configuration parameter $P\_2$ and a second parameter $IA\_2$ of the initial audiogram, e.g. $A\_2=IA\_2+P\_2$.

Determining a configuration audiogram may comprise determining one or more, such as all, parameters $A\_3$-$A\_N$ (for frequency ranges $F\_3$-$F\_N$) of the configuration audiogram based on the first configuration parameter $P\_1$ and/or based on the second configuration parameter $P\_2$. In other words, parameters of the configuration audiogram may be a function of the first configuration parameter $P\_1$ and/or the second configuration parameter $P\_2$.

Determining a configuration audiogram may comprise determining one or more, such as all, parameters $A\_3$-$A\_N$ (for frequency ranges $F\_3$-$F\_N$) of the configuration audiogram based on the parameter $A\_1$ and/or based on the parameter $A\_2$. A parameter $A\_i$ (for $i=3, \ldots, N$) may be based on a weighted sum of the first configuration parameter and the second configuration parameter. For example, a parameter $A\_i$ for frequency range $F\_i$ may be given by:

$$A\_i=IA\_i+a*P\_1+(1-a)*P\_2,$$

where a is in the range from 0 to 1 and decreases (e.g. stepwise or linearly) with increased frequency.

In one or more exemplary methods, obtaining a first configuration parameter comprises detecting a first user input indicative of the first configuration parameter via a first control of the user interface. Detecting a first user input indicative of the first configuration parameter may comprise detecting contact followed by detecting a liftoff on the first user interface element of the user interface. Accordingly, the user interface may comprise a first control or first user interface element allowing a user to indicate or set a value of the first configuration parameter.

In one or more exemplary methods, obtaining a second configuration parameter comprises detecting a second user input indicative of the second configuration parameter via a second control of the user interface. Detecting a second user input indicative of the second configuration parameter may comprise detecting contact followed by detecting a liftoff on the second user interface element of the user interface. Accordingly, the user interface may comprise a second control or second user interface element allowing a user to indicate or set a value of the second configuration parameter.

In one or more exemplary methods, the method comprises obtaining a third configuration parameter, also denoted $P\_3$, indicative of hearing loss and/or user preference in a third frequency range $F\_3$. Accordingly, the user interface may comprise a third control or third user interface element allowing a user to indicate or set a value of the third configuration parameter. The third frequency range may be different from the first frequency range. The third frequency range may be different from the second frequency range. The third frequency range may be between the first frequency range and the second frequency range.

In one or more exemplary methods and/or devices, two or more configuration parameters, such as the first, second and/or third configuration parameter, may be preferred to determine the configuration audiogram for a user having a moderate hearing loss. In one or more exemplary methods and/or devices, the number of configuration parameters and/or controls is less than 10, such as in the range from 2 to 5, e.g. in order to reduce complexity for the user, thus providing a simple user interface for hearing device control/settings.

In one or more exemplary methods, determining a configuration audiogram is based on the third configuration parameter. For example, determining a configuration audiogram may comprise interpolating the configuration audiogram based on the first configuration parameter, the second configuration parameter, the third configuration parameter, and the initial audiogram.

Determining a configuration audiogram may comprise determining one or more, such as all, parameters $A\_4$-$A\_N$ (for frequency ranges $F\_4$-$F\_N$) of the configuration audiogram based on the third configuration parameter $P\_3$ and optionally the first configuration parameter and/or the second configuration parameter $P\_2$. In other words, parameters of the configuration audiogram may be a function of one or more of the first configuration parameter $P\_1$, the second configuration parameter $P\_2$, and the third configuration parameter.

In one or more exemplary methods, obtaining a third configuration parameter comprises detecting a third user input indicative of the third configuration parameter via a third control of the user interface. Detecting a third user input indicative of the third configuration parameter may comprise detecting contact followed by detecting a liftoff on third user interface element of the user interface. Accordingly, the user interface may comprise a third control or third user interface element allowing a user to indicate or set a value of the third configuration parameter.

For example, a user interface may comprise a graphic equalizer (EQ) for configuring hearing device parameters of a hearing device. Accordingly, detecting a user input (e.g. a first user input and/or a second user input) indicative of a configuration parameter (e.g. a first configuration parameter and/or a second configuration parameter and/or a third configuration parameter) via a control (e.g. a first control and/or a second control and/or a third control) of the user interface may comprise a user moving a control (e.g. a first slider and/or second slider on the graphic EQ) up and/or down. The first slider may also be referred to as a bass slider for adjusting the bass, i.e. low frequencies. The second slider may also be referred to as a treble slider for adjusting the treble, i.e. high frequencies.

In one or more example method/device, the control may comprise a first slider as a first control. Thus, a user moving the first slider up may be indicative of compensating for an increased hearing loss in the first frequency range, e.g. a low-frequency range. Accordingly, a user moving the first slider up may comprise determining an increased low-frequency gain (e.g. according to an existing fitting rule). Further, a user moving the first slider down may be indicative of compensating for a decreased hearing loss in the first frequency range, e.g. a low-frequency range.

In one or more example method/device, the control may comprise a second slider as a second control. Thus, a user moving the second slider up may be indicative of compensating for an increased hearing loss in the second frequency range, e.g. high-frequency range. Further, a user moving the second slider down may be indicative of compensating for a decreased hearing loss in the second frequency range, e.g. high-frequency range. Accordingly, moving the second slider up may comprise determining an increased high-frequency gain (e.g. according to an existing fitting rule).

In one or more example method/device, the control may comprise a third slider as a third control. Thus, a user moving the third slider up may be indicative of compensating for an increased hearing loss in the third frequency range, e.g. a middle-frequency range. Accordingly, a user moving the third slider up may comprise determining an increased middle-frequency gain (e.g. according to an existing fitting rule). Further, a user moving the third slider down may be indicative of compensating for a decreased hearing loss in the third frequency range, e.g. a middle-frequency range.

Thereby, the controls may actually control configuration parameters comprising level-dependent gains (e.g., at 50- and 80-dB sound pressure level (SPL)) in any number of channels, compression thresholds, and/or time constants.

In one or more exemplary methods/devices, where the user interface comprises a graphic EQ comprising one or more slider ranges, the slider range may depend on user input and/or parameters of the initial audiogram. For example, the initial range of a slider may correspond to −10 to +20 dB hearing level (HL). When the user sets a slider to (or near)+20, the slider range may scale to −10 to +30 dB HL, thus allowing the user to incrementally increase the gain of the hearing device. Similarly, the slider range may auto-scale back to a max of +20 dB HL when the user pulls the slider down below +20 db.

In one or more exemplary methods/devices, the user interface may comprise an inverted view of an audiogram, e.g. may comprise a graphic EQ comprising an inverted view of an audiogram. The inverted view of an audiogram may be an inverted view of the initial audiogram. Thereby, the user may e.g. move one or more sliders up rather than down for compensating for a hearing loss, which is more intuitive for the user.

In one or more exemplary methods, determining gain parameters comprises determining the gain parameters, such as one, two or three gain parameters for each frequency band, based on a fitting rule. For example, a fitting rule may comprise or be Audiogram+, NAL-NL2, Fig6, and/or DSL i/o.

For example, using the Fig6 fitting rule and supposing that a parameter $A\_5$ of the configuration audiogram is determined as 30 dBHL in $F\_5$ (1 kHz), the level-dependent gains $G\_5\_40$, $G\_5\_65$, and $G\_5\_95$ are given as:

$G\_5\_40$=30 dB−20 dB=10 dB IG (Insertion Gain)

$G\_5\_65$=0.6*(30 dB−20 dB)=6 dB IG (Insertion Gain)

$G\_5\_95$=0 dB IG (Insertion Gain)

For example, in case the user interface comprises a graphic equalizer (EQ) comprising sliders for adjusting the configuration parameters/gain parameters of the hearing device, the user may e.g. slide a second (high-frequency) slider thereby increasing one or a plurality of (high-frequency) gain parameters.

In one or more exemplary methods, configuring the hearing device parameters of the hearing device based on the gain parameters comprises updating one or more level-dependent gains of the hearing device.

In one or more exemplary methods, configuring the hearing device parameters of the hearing device based on the gain parameters may comprise updating one or more compression thresholds of the hearing device, e.g. by wirelessly transmitting gain parameters and/or hearing device parameters to the hearing device from the electronic device.

In one or more exemplary methods, configuring the hearing device parameters of the hearing device based on the gain parameters comprises updating one or more time constants of the hearing device.

In one or more exemplary methods, the method comprises obtaining, e.g. via a store control or store user interface element of the user interface, a storing request indicative of the user's intent to store the determined configuration audiogram. In one or more exemplary methods, the method comprises storing the determined configuration audiogram. In one or more exemplary methods, the method comprises storing the determined configuration audiogram in response to obtaining the storing request indicative of the user's intent to storing the determined configuration audiogram. The method may comprise storing the obtained first configuration parameter. The method may comprise storing the obtained second configuration parameter.

In one or more exemplary methods, obtaining an initial audiogram comprises determining the initial audiogram based on the stored determined configuration audiogram.

In one or more exemplary methods, obtaining an initial audiogram comprises determining the initial audiogram based on the stored obtained first configuration parameter.

In one or more exemplary methods, obtaining an initial audiogram comprises determining the initial audiogram based on the stored obtained second configuration parameter.

For example, the user may recall an initial audiogram based on a stored determined configuration audiogram, a stored obtained first configuration parameter, and/or an obtained second configuration parameter. Accordingly, the user may recall a determined configuration diagram based on stored first configuration parameter, second configuration parameter, and initial audiogram, which may have been suitable for the user.

In one or more exemplary methods, obtaining an initial audiogram comprises applying a machine-learning processing scheme based on the stored determined configuration audiogram. In one or more exemplary methods, applying a machine-learning processing scheme based on the stored determined configuration audiogram comprises applying Bayesian optimization. In one or more exemplary methods, the method comprises obtaining a further initial audiogram. Obtaining a further initial audiogram may comprise repeating obtaining a first configuration parameter, obtaining a second configuration parameter, determining a configuration audiogram, determining gain parameters, and configuring the hearing device parameters of the hearing device.

In one or more exemplary methods/electronic devices, the initial audiogram is based on age and/or gender of the user. In one or more exemplary methods/electronic devices, the initial audiogram is based on the level of experience of the user in wearing a hearing device. For example, the user may be an experienced user or a first-time user. In one or more exemplary methods/electronic devices, the initial audiogram is based on bone conduction thresholds. In one or more exemplary methods/electronic devices, the initial audiogram is based on an uncomfortable loudness level (UCL) of the user. In one or more exemplary methods/electronic devices, the initial audiogram is based on binaural balance of the user.

Accordingly, user preferences changing over time and/or changes in typical sound environments experienced by the user may be stored, and personalization of the hearing device is performed during normal use of the hearing aid. Thereby, fewer user manipulations during periods of unchanging user preferences and a larger robustness to inconsistent user behavior is obtained.

In one or more exemplary methods and/or devices, a configuration parameter may refer to a parameter related to user input not including a specific frequency range. Such configuration parameter may be set or entered on the electronic device/accessory device via the user interface by the user, e.g. by using the second and/or third control or second and/or third user interface element. In one or more exemplary methods and/or devices, such configuration parameters may be set or entered on the electronic device/accessory device via the user interface by the user, e.g. during a setup procedure of a user profile on the electronic device/accessory device. In one or more exemplary methods, a configuration parameter, such as the second and/or third configuration parameter, is based on age and/or gender of the user.

In one or more exemplary methods, a configuration parameter, such as the second and/or third configuration parameter, is based on the level of experience of the user in wearing a hearing device. For example, the user may be an experienced user or a first-time user.

In one or more exemplary methods, a configuration parameter, such as the second and/or third configuration parameter, is based on bone conduction thresholds.

In one or more exemplary methods, a configuration parameter, such as the second and/or third configuration parameter, is based on an uncomfortable loudness level (UCL) of the user.

In one or more exemplary methods, a configuration parameter, such as the second and/or third configuration parameter, is based on binaural balance of the user.

An electronic device for configuring hearing device parameters of a hearing device to be worn by a user is disclosed. The electronic device comprises a processor, a memory, and an interface comprising a user interface. The electronic device may be a smart phone, a tablet or other portable electronic devices.

The processor is optionally configured to obtain, e.g. from the memory and/or via the interface, an initial audiogram.

The processor is configured to obtain, via the user interface, a first configuration parameter indicative of hearing loss and/or user preference in a first frequency range.

The processor is configured to obtain, via the user interface, a second configuration parameter indicative of hearing loss and/or user preference in a second frequency range different from the first frequency range.

The processor is configured to determine a configuration audiogram based on the first configuration parameter, the second configuration parameter, and the initial audiogram.

The processor is configured to determine gain parameters based on the configuration audiogram. The processor is configured to configure the hearing device parameters of the hearing device based on the gain parameters.

In one or more exemplary electronic devices, the processor is configured to determine the configuration audiogram by interpolating the configuration audiogram based on the first configuration parameter, the second configuration parameter, and the initial audiogram.

In one or more exemplary electronic devices, the processor is configured to obtain the first configuration parameter by detecting a first user input indicative of the first configuration parameter via a first control of the user interface.

In one or more exemplary electronic devices, the processor is configured to obtain the second configuration parameter by detecting a second user input indicative of the second configuration parameter via a second control or second user interface element of the user interface.

In one or more exemplary electronic devices, the processor is configured to obtain, via the user interface, a third configuration parameter indicative of the third configuration parameter via a third control or third user interface element of the user interface. The third configuration parameter may be indicative of hearing loss and/or user preference in a third frequency range different from the first frequency range and the second frequency range.

In one or more exemplary electronic devices, the processor is configured to determine the configuration audiogram based on the third configuration parameter.

It is to be understood that features described in relation to methods may be implemented in the electronic device and vice/versa.

FIG. 1 is a flow diagram of an exemplary method according to the disclosure. A method 100 for configuring hearing device parameters of a hearing device to be worn by a user is disclosed. The method may be performed in an electronic device. The electronic device may comprise a processor, a memory, and an interface comprising a user interface.

The method comprises obtaining S102, via an obtainer module of the processor and/or via the user interface, an initial audiogram. The obtainer module or the user interface may be configured to obtain an initial audiogram. The memory may be configured to store the initial audiogram.

The method comprises obtaining S104, via the user interface, a first configuration parameter indicative of hearing loss and/or user preference in a first frequency range and obtaining S106, via the user interface, a second configuration parameter indicative of hearing loss and/or user preference in a second frequency range different from the first frequency range.

The method comprises determining S108, via a determiner module of the processor, a configuration audiogram based on the first configuration parameter, the second configuration parameter, and optionally the initial audiogram. The method comprises determining S110, via the determiner module of the processor, gain parameters based on the configuration audiogram. The determiner module is configured to determine gain parameters based on the configuration audiogram. The method comprises configuring S112, via the processor, the hearing device parameters of the hearing device based on the gain parameters.

In one or more exemplary methods, determining S108 a configuration audiogram comprises interpolating S108A, via the processor of the electronic device, the configuration audiogram based on the first configuration parameter, the second configuration parameter, and the initial audiogram.

In one or more exemplary methods, determining S108 a configuration audiogram comprises interpolating S108A, via the processor of the electronic device, the configuration audiogram based on the first configuration parameter and the initial audiogram.

In one or more exemplary methods, obtaining S104 a first configuration parameter comprises detecting S104A a first user input indicative of the first configuration parameter via a first control of the user interface.

In one or more exemplary methods, obtaining S106 a second configuration parameter comprises detecting S106A a second user input indicative of the second configuration parameter via a second control of the user interface.

In one or more exemplary methods, the method comprises obtaining S107, via a user interface, a third configuration parameter indicative of hearing loss and/or user preference in a third frequency range different from the first frequency range and the second frequency range. In one or more exemplary methods, determining S108, via the determiner module of the processor, a configuration audiogram is based on the third configuration parameter.

In one or more exemplary methods, obtaining S107 a third configuration parameter comprises detecting S107A a third user input indicative of the third configuration parameter via a third control of the user interface.

In one or more exemplary methods, determining S110 gain parameters comprises determining S110A, via the processor, the gain parameters based on a fitting rule.

In one or more exemplary methods, configuring S112 the hearing device parameters of the hearing device based on the gain parameters comprises updating S112A, e.g. via the processor, one or more level-dependent gains of the hearing device.

In one or more exemplary methods, configuring S112 the hearing device parameters of the hearing device based on the gain parameters comprises updating S112B, via the processor, one or more compression thresholds of the hearing device.

In one or more exemplary methods, configuring S112 the hearing device parameters of the hearing device based on the gain parameters comprises updating S112C, via the processor, one or more time constants of the hearing device.

Figure 2:
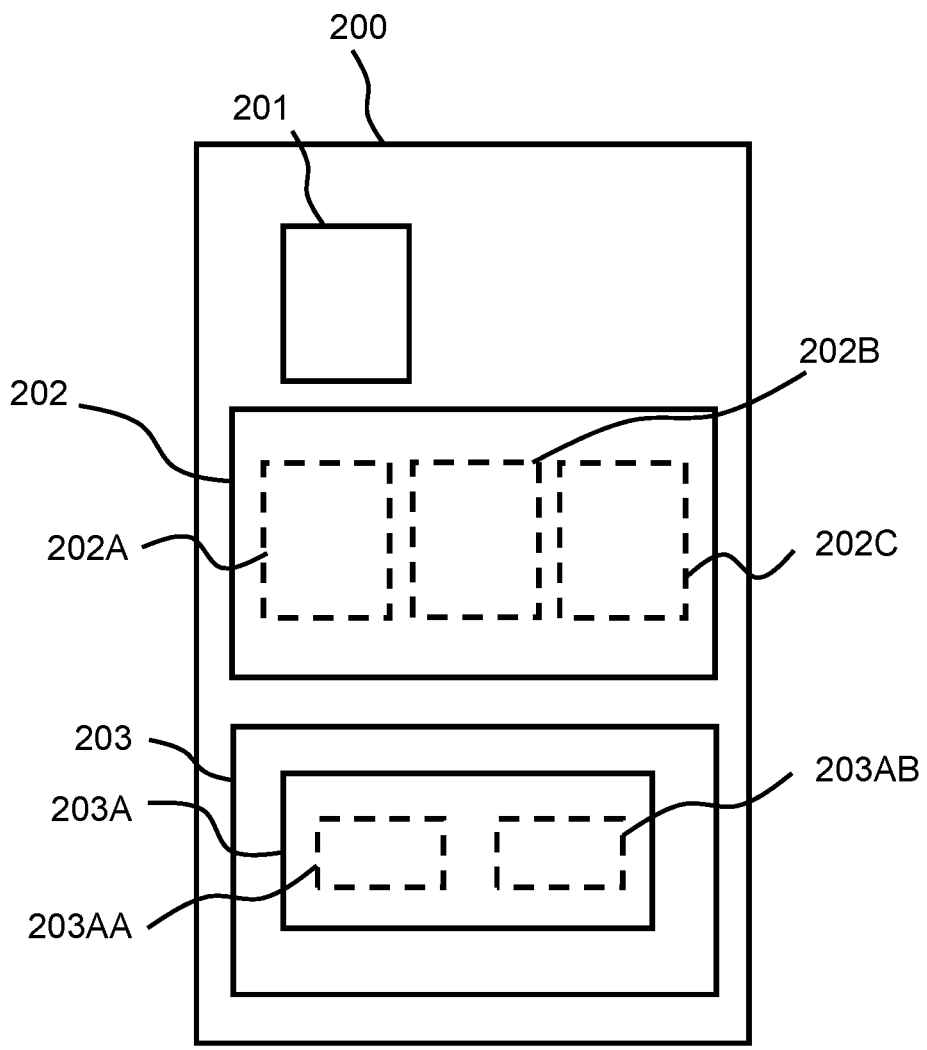
FIG. 2 schematically illustrates an exemplary electronic device.

FIG. 2 is a schematic illustration of an exemplary electronic device. An electronic device 200 for configuring hearing device parameters of a hearing device to be worn by a user is disclosed. The electronic device 200 comprises a processor 202, a memory 201, and an interface 203 comprising a user interface 203A.

The processor 202 is configured to obtain, via an obtainer module 202A, an initial audiogram. The processor 202 is configured to obtain, via the user interface 203A, a first configuration parameter indicative of hearing loss and/or user preference in a first frequency range.

The processor 202 is configured to obtain, via the user interface 203A, a second configuration parameter indicative of hearing loss and/or user preference in a second frequency range different from the first frequency range.

The processor 202 is configured to determine, via a determiner module 202B, a configuration audiogram based on the first configuration parameter, the second configuration parameter, and the initial audiogram. The processor 202 is configured to determine, via the determiner module 202B, gain parameters based on the configuration audiogram.

The processor 202 is configured to configure, via a configuration module 202C, the hearing device parameters of the hearing device based on the gain parameters.

In one or more exemplary electronic devices, the processor 202 is configured to determine, via the determiner module 202B, the configuration audiogram by interpolating the configuration audiogram based on the first configuration parameter, the second configuration parameter, and/or the initial audiogram.

In one or more exemplary electronic devices, the processor 202 is configured to obtain, via the obtainer module 202A, the first configuration parameter by detecting a first user input indicative of the first configuration parameter via a first control 203AA of the user interface 203A. In one or more exemplary electronic devices, the processor 202 is configured to obtain, via the obtainer module 202A, the second configuration parameter by detecting a second user input indicative of the second configuration parameter via a second control 203AB of the user interface 203A. In one or more exemplary electronic devices, the processor 202 is configured to obtain, via the user interface 203A, a third configuration parameter indicative of hearing loss and/or user preference in a third frequency range different from the first frequency range and the second frequency range. In one or more exemplary electronic devices, the processor 202 is configured to determine the configuration audiogram based on the third configuration parameter.

Figure 3:
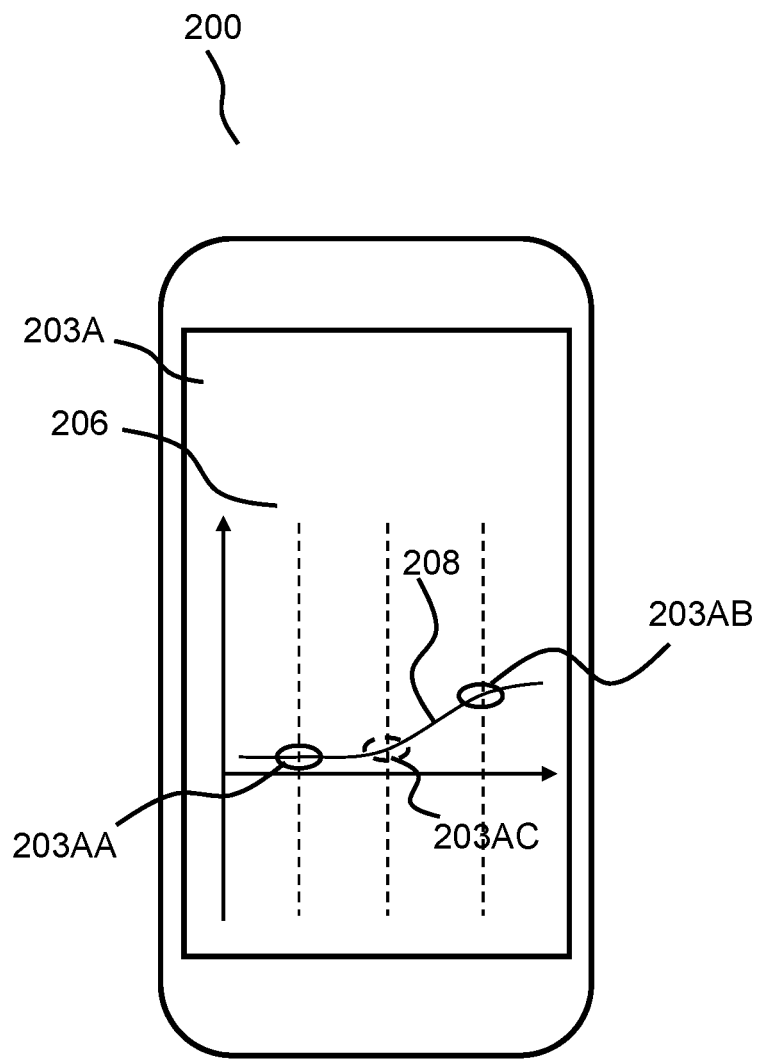
FIG. 3 schematically illustrates an exemplary user interface.

FIG. 3 shows an electronic device 200 with a user interface. The user interface 203A comprises a graphic equalizer 206 with first user interface element 203AA, second user interface element 203AB, and third user interface element 203AC. The user interface elements 203AA, 203AB, 203AC can be moved up and/or down along the dotted lines thereby allowing a user to indicate values of first, second and third configuration parameters, respectively. The first configuration parameter is indicative of a desired gain or change of gain in a first (low) frequency range, the second configuration parameter is indicative of a desired gain or change of gain in a second (high) frequency range, and the third configuration parameter is indicative of a desired gain or change of gain in a third (medium) frequency range. The graphic equalizer 206 optionally comprises a curve 208 representative of the hearing loss and/or user preference of the user and/or current settings of the hearing device. The curve may be updated, e.g. upon liftoff of a finger on the user interface, to fit the values of the first configuration parameter, the second configuration parameter, and optionally the third configuration parameter.

Embodiments of electronic devices and related methods according to the disclosure are set out in the following items:

Item 1. Method for configuring hearing device parameters of a hearing device to be worn by a user, the method comprising:

obtaining an initial audiogram;

obtaining, via a user interface, a first configuration parameter indicative of hearing loss and/or user preference in a first frequency range;

optionally obtaining, via the user interface, a second configuration parameter indicative of hearing loss and/or user preference in a second frequency range different from the first frequency range;

determining a configuration audiogram based on the first configuration parameter, optionally the second configuration parameter, and the initial audiogram;

determining gain parameters based on the configuration audiogram; and configuring the hearing device parameters of the hearing device based on the gain parameters.

Item 2. Method according to item 1, wherein determining a configuration audiogram comprises interpolating the configuration audiogram based on the first configuration parameter, the second configuration parameter, and the initial audiogram.

Item 3. Method according to any of items 1-2, wherein obtaining a first configuration parameter comprises detecting a first user input indicative of the first configuration parameter via a first control of the user interface.

Item 4. Method according to any of items 1-3, wherein obtaining a second configuration parameter comprises detecting a second user input indicative of the second configuration parameter via a second control of the user interface.

Item 5. Method according to any of items 1-4, wherein the method comprises obtaining a third configuration parameter indicative of hearing loss and/or user preference in a third frequency range different from the first frequency range and the second frequency range, and wherein determining a configuration audiogram is based on the third configuration parameter.

Item 6. Method according to item 5, wherein obtaining a third configuration parameter comprises detecting a third user input indicative of the third configuration parameter via a third control of the user interface.

Item 7. Method according to any of items 1-6, wherein determining gain parameters comprises determining the gain parameters based on a fitting rule.

Item 8. Method according to any of items 1-7, wherein configuring the hearing device parameters of the hearing device based on the gain parameters comprises updating one or more level-dependent gains of the hearing device.

Item 9. Method according to any of items 1-8, wherein configuring the hearing device parameters of the hearing device based on the gain parameters comprises updating one or more compression thresholds of the hearing device.

Item 10. Method according to any of items 1-9, wherein configuring the hearing device parameters of the hearing device based on the gain parameters comprises updating one or more time constants of the hearing device.

Item 11. An electronic device for configuring hearing device parameters of a hearing device to be worn by a user, the electronic device comprising a processor, a memory, and an interface comprising a user interface, wherein the processor is configured to:
obtain an initial audiogram;
obtain, via the user interface, a first configuration parameter indicative of hearing loss and/or user preference in a first frequency range;
obtain, via the user interface, a second configuration parameter indicative of hearing loss and/or user preference in a second frequency range different from the first frequency range;
determine a configuration audiogram based on the first configuration parameter, the second configuration parameter, and the initial audiogram;
determine gain parameters based on the configuration audiogram; and
configure the hearing device parameters of the hearing device based on the gain parameters.

Item 12. The electronic device according to item 11, wherein the processor is configured to determine the configuration audiogram by interpolating the configuration audiogram based on the first configuration parameter, the second configuration parameter, and the initial audiogram.

Item 13. The electronic device according to any of items 11-12, wherein the processor is configured to obtain the first configuration parameter by detecting a first user input indicative of the first configuration parameter via a first control of the user interface.

Item 14. The electronic device according to any of items 11-13, wherein the processor is configured to obtain the second configuration parameter by detecting a second user input indicative of the second configuration parameter via a second control of the user interface.

Item 15. The electronic device according to any of items 11-14, wherein the processor is configured to obtain, via the user interface, a third configuration parameter indicative of hearing loss and/or user preference in a third frequency range different from the first frequency range and the second frequency range, and wherein the processor is configured to determine the configuration audiogram based on the third configuration parameter.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-2 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 100 method for configuring hearing device parameters
S102 obtaining an initial audiogram
S104 obtaining a first configuration parameter
S104A detecting a first user input
S106 obtaining a second configuration parameter
S106A detecting a second user input
S107 obtaining a third configuration parameter
S107A detecting a third user input
S108 determining a configuration audiogram
S108A interpolating the configuration audiogram
S110 determining gain parameters
S110A determining the gain parameters
S112 configuring the hearing device parameters of the hearing device
S112A updating one or more level-dependent gains of the hearing device
S112B updating one or more compression thresholds of the hearing device
S112C updating one or more time constants of the hearing device
200 electronic device
201 memory
202 processor
202A obtainer module
202B determiner module
202C configuration module
203 interface
203A user interface
203AA first control/first user interface element
203AB second control/second user interface element
203AC third control/third user interface element
206 graphic equalizer
208 curve

The invention claimed is:

1. An electronic device for configuring a hearing device parameter of a hearing device to be worn by a user, the electronic device comprising:
a processor;
a memory; and
a user interface, wherein the processor is configured to:
electronically obtain an initial audiogram for the user;
obtain a first configuration parameter indicative of hearing loss and/or user preference in a first frequency range after the initial audiogram is obtained, wherein the first configuration parameter is based on an action of the user detected by the user interface;
determine a configuration audiogram based on the first configuration parameter and the initial audiogram, wherein the configuration audiogram is an updated audiogram;
determine a gain parameter based on the configuration audiogram; and
configure the hearing device parameter of the hearing device based on the gain parameter;
wherein the initial audiogram comprises audiogram data, and wherein the audiogram data is different from the gain parameter, and is predetermined independent of the user; and
wherein the processor is configured to electronically obtain the initial audiogram by obtaining a predetermined audiogram that is predetermined before the processor obtains the initial audiogram.

2. The electronic device according to claim 1, wherein the processor is configured to determine the configuration audiogram by interpolating the configuration audiogram.

3. The electronic device according to claim 1, wherein the processor is configured to obtain the first configuration parameter based on a first user input received via a first control of the user interface.

4. The electronic device according to claim 1, wherein the processor is also configured to obtain a second configuration parameter indicative of hearing loss and/or user preference in a second frequency range different from the first frequency range.

5. The electronic device according to claim 4, wherein the processor is configured to obtain the first configuration parameter based on a first user input received via a first control of the user interface, and to obtain the second configuration parameter based on a second user input received via a second control of the user interface.

6. The electronic device according to claim 4, wherein the processor is configured to determine the configuration audiogram based on the first configuration parameter, the second configuration parameter, and the initial audiogram.

7. The electronic device according to claim 4, wherein the processor is configured to obtain a third configuration parameter indicative of hearing loss and/or user preference in a third frequency range different from the first frequency range and the second frequency range, and wherein the processor is configured to determine the configuration audiogram based the first configuration parameter, the second configuration parameter, the third configuration parameter, and the initial audiogram.

8. The electronic device according to claim 7, wherein the first configuration parameter is based on a first user input received via a first control of the user interface, the second configuration parameter is based on a second user input received via a second control of the user interface, and the third configuration parameter is based on a third user input received via a third control of the user interface.

9. A method for configuring a hearing device parameter of a hearing device to be worn by a user, the method comprising:
electronically obtaining an initial audiogram for the user;
obtaining a first configuration parameter indicative of hearing loss and/or user preference in a first frequency range after the initial audiogram is obtained, wherein the first configuration parameter is based on an action of the user detected by the user interface;
determining a configuration audiogram based on the first configuration parameter and the initial audiogram, wherein the configuration audiogram is an updated audiogram;
determining a gain parameter based on the configuration audiogram; and
configuring the hearing device parameter of the hearing device based on the gain parameter;

wherein the initial audiogram comprises audiogram data, and wherein the audiogram data is different from the gain parameter, and is predetermined independent of the user; and wherein the initial audiogram is electronically obtained by obtaining a predetermined audiogram that is predetermined before the initial audiogram is obtained.

10. The method according to claim 9, wherein the first configuration parameter is based on a first user input received via a first control of the user interface.

11. The method according to claim 9, further comprising obtaining a second configuration parameter indicative of hearing loss and/or user preference in a second frequency range different from the first frequency range, and wherein the configuration audiogram is determined based on the first configuration parameter, the second configuration parameter, and the initial audiogram.

12. The method according to claim 11, wherein the act of determining the configuration audiogram comprises interpolating the configuration audiogram.

13. The method according to claim 11, wherein the first configuration parameter is based on a first user input received via a first control of the user interface, and the second configuration parameter is based on a second user input received via a second control of the user interface.

14. The method according to claim 11, further comprising obtaining a third configuration parameter indicative of hearing loss and/or user preference in a third frequency range different from the first frequency range and the second frequency range, and wherein the configuration audiogram is determined based on the first configuration parameter, the second configuration parameter, the third configuration parameter, and the initial audiogram.

15. The method according to claim 14, wherein the first configuration parameter is based on a first user input received via a first control of the user interface, the second configuration parameter is based on a second user input received via a second control of the user interface, and the third configuration parameter is based on a third user input received via a third control of the user interface.

16. The method according to claim 9, wherein the determining gain parameter is determined based on a fitting rule.

17. The method according to claim 9, wherein the act of configuring the hearing device parameter of the hearing device comprises updating one or more level-dependent gains of the hearing device.

18. The method according to claim 9, wherein the act of configuring the hearing device parameter of the hearing device comprises updating one or more compression thresholds of the hearing device.

19. The electronic device according to claim 1, wherein the user interface is configured to present a plurality of controls after the initial audiogram is obtained, wherein the controls are configured for adjusting respective parameters in respective frequencies, one of the parameters being the first configuration parameter.

20. The electronic device according to claim 19, wherein the controls comprise respective slidable objects arranged in a side-by-side configuration.

21. The electronic device according to claim 1, wherein the processor is configured to obtain the first configuration parameter for a current fitting session, and the initial audiogram is associated with a previous fitting session.

22. An electronic device for configuring a hearing device parameter of a hearing device to be worn by a user, the electronic device comprising:

a processor;
a memory; and
a user interface, wherein the processor is configured to:
electronically obtain an initial audiogram for the user;
obtain a first configuration parameter indicative of hearing loss and/or user preference in a first frequency range after the initial audiogram is obtained, wherein the first configuration parameter is based on an action of the user detected by the user interface;
determine a configuration audiogram based on the first configuration parameter and the initial audiogram, wherein the configuration audiogram is an updated audiogram;
determine a gain parameter based on the configuration audiogram; and
configure the hearing device parameter of the hearing device based on the gain parameter;
wherein the initial audiogram comprises audiogram data, and wherein the audiogram data is predetermined independent of the user; and
wherein the processor is configured to electronically obtain the initial audiogram by selecting one of a plurality of reference audiograms that are predetermined before the processor obtains the initial audiogram.

23. An electronic device for configuring a hearing device parameter of a hearing device to be worn by a user, the electronic device comprising:

a processor;
a memory; and
a user interface, wherein the processor is configured to:
electronically obtain an initial audiogram;
obtain a first configuration parameter indicative of hearing loss and/or user preference in a first frequency range after the initial audiogram is obtained, wherein the first configuration parameter is based on an action of the user detected by the user interface;
determine a configuration audiogram based on the first configuration parameter and the initial audiogram, wherein the configuration audiogram is an updated audiogram;
determine a gain parameter based on the configuration audiogram; and
configure the hearing device parameter of the hearing device based on the gain parameter;
wherein the processor is configured to electronically obtain the initial audiogram by obtaining a predetermined audiogram that is predetermined before the processor obtains the initial audiogram.

24. The method according to claim 9, wherein the first configuration parameter is obtained for a current fitting session, and the initial audiogram is associated with a previous fitting session.

25. A method for configuring a hearing device parameter of a hearing device to be worn by a user, the method comprising:

electronically obtaining an initial audiogram for the user;
obtaining a first configuration parameter indicative of hearing loss and/or user preference in a first frequency range after the initial audiogram is obtained, wherein the first configuration parameter is based on an action of the user detected by the user interface;
determining a configuration audiogram based on the first configuration parameter and the initial audiogram, wherein the configuration audiogram is an updated audiogram;
determining a gain parameter based on the configuration audiogram; and configuring the hearing device parameter of the hearing device based on the gain parameter;

wherein the initial audiogram comprises audiogram data, and wherein the audiogram data is predetermined independent of the user; and wherein the initial audiogram is obtained by selecting one of a plurality of reference audiograms that are predetermined before the initial audiogram is obtained.

26. The method according to claim 9, wherein the act of electronically obtaining the initial audiogram comprises determining the initial audiogram based on a non-hearing characteristic.

\* \* \* \* \*